(12) United States Patent
Kohlrusch

(10) Patent No.: US 12,037,986 B2
(45) Date of Patent: Jul. 16, 2024

(54) SEAL ARRANGEMENT FOR A BEARING, WIND ENERGY SYSTEM, AND METHOD FOR ARRANGING A SEAL ARRANGEMENT

(71) Applicant: Nordex Energy SE & Co. KG, Hamburg (DE)

(72) Inventor: Matthias Kohlrusch, Schwaan (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/852,098

(22) Filed: Jun. 28, 2022

(65) Prior Publication Data

US 2022/0412323 A1 Dec. 29, 2022

(30) Foreign Application Priority Data

Jun. 28, 2021 (DE) ...................... 10 2021 116 583.0

(51) Int. Cl.
*F03D 80/70* (2016.01)
*F03D 80/80* (2016.01)

(52) U.S. Cl.
CPC .............. *F03D 80/70* (2016.05); *F03D 80/80* (2016.05); *F05D 2240/50* (2013.01); *F05D 2240/55* (2013.01)

(58) Field of Classification Search
CPC ............. F05D 2240/00; F05D 2240/50; F05D 2240/55; F05D 2240/58; F05D 2240/581; F03D 80/00; F03D 80/70; F03D 80/80
USPC ........................................................ 277/345
See application file for complete search history.

(56) References Cited

U.S. PATENT DOCUMENTS

| 2,391,159 | A | | 12/1945 | Hermansen | |
|---|---|---|---|---|---|
| 4,863,177 | A | | 9/1989 | Rockwood et al. | |
| 4,883,279 | A | * | 11/1989 | Sabo | F16C 33/72 277/500 |
| 6,308,960 | B1 | * | 10/2001 | Peale | H04R 9/00 277/631 |
| 6,378,875 | B1 | * | 4/2002 | Feistel | F16J 9/16 277/435 |
| 9,976,541 | B2 | * | 5/2018 | Smith | F16C 33/6637 |
| 2008/0272555 | A1 | * | 11/2008 | Taylor | F16J 15/26 277/540 |

(Continued)

FOREIGN PATENT DOCUMENTS

| CH | 186910 A | 10/1936 |
|---|---|---|
| DE | 16505 | 3/1956 |

(Continued)

*Primary Examiner* — Nathan Cumar
(74) *Attorney, Agent, or Firm* — Walter Ottesen, P.A.

(57) ABSTRACT

A seal arrangement is disclosed for sealing an interior space between a bearing housing and a rotatable shaft with respect to a surrounding area. The seal arrangement includes a seal body which can be fastened to the bearing housing with a first end and a second end. The seal body is extended in an elongate manner along a main extent direction and is configured to be arranged in an annular manner around the rotatable shaft in a mounted state. The first end and the second end have a common butt joint. A projecting region is arranged at the first end of the seal body and projects tangentially with respect to the rotatable shaft in the direction of a predefined main rotational direction of the rotatable shaft. The projecting region projects beyond the seal body and overlaps the butt joint.

15 Claims, 9 Drawing Sheets

(56) References Cited

U.S. PATENT DOCUMENTS

| | | |
|---|---|---|
| 2010/0308594 A1 | 12/2010 | Numajiri |
| 2013/0322803 A1 | 12/2013 | Gruber et al. |
| 2022/0010784 A1 | 1/2022 | Hoelzl |

FOREIGN PATENT DOCUMENTS

| | | | |
|---|---|---|---|
| DE | 26 04 517 A1 | 8/1977 | |
| DE | 42 15 905 A1 | 11/1993 | |
| DE | 692 10 585 T2 | 9/1996 | |
| DE | 102 01 013 A1 | 7/2003 | |
| DE | 10 2010 061 932 B3 | 6/2012 | |
| DE | 10 2015 209 063 A1 | 11/2016 | |
| DE | 10 2015 210 637 A1 | 12/2016 | |
| DE | 10 2015 221 412 A1 | 5/2017 | |
| DE | 202017002146 U1 * | 7/2017 | |
| DE | 10 2016 118 052 A1 | 3/2018 | |
| DE | 10 2016 118 057 A1 | 3/2018 | |
| DE | 10 2018 119 132 A1 | 2/2019 | |
| EP | 2 176 546 B1 | 4/2010 | |
| EP | 2 535 577 A1 | 12/2012 | |
| EP | 2 565 477 A1 | 3/2013 | |
| EP | 3 236 096 A1 | 10/2017 | |
| JP | JPWO2010/007677 A1 | 1/2012 | |
| JP | 2014-20523 A | 2/2014 | |
| NO | 168268 B | 10/1991 | |
| WO | WO-9213217 A1 * | 8/1992 | ......... B29C 33/0016 |
| WO | 2018/145785 A1 | 8/2018 | |
| WO | 2019/155322 A1 | 8/2019 | |
| WO | 2020/118333 A1 | 6/2020 | |

* cited by examiner

SEAL ARRANGEMENT FOR A BEARING, WIND ENERGY SYSTEM, AND METHOD FOR ARRANGING A SEAL ARRANGEMENT

CROSS REFERENCE TO RELATED APPLICATION

This application claims priority of German patent application no. 10 2021 116 583.0, filed Jun. 28, 2021, the entire content of which is incorporated herein by reference.

TECHNICAL FIELD

The disclosure relates to a seal arrangement for sealing an interior space between a bearing housing and a rotatable shaft with respect to a surrounding area, and to a wind energy system with a seal arrangement of this type. In addition, the disclosure relates to a method for arranging a seal arrangement for sealing an interior space between a bearing housing and a rotatable shaft with respect to a surrounding area, in particular to a method for arranging a seal arrangement as described herein.

BACKGROUND

A wind energy system has a rotor with which wind energy can be converted into a drive torque which can drive a generator via a drive train. The drive train, the generator and other components can be mounted in a nacelle which is positioned on a tower. The drive train typically has a rotor shaft which is mounted by way of one (or more) rotor bearing/bearings. The rotor bearing/bearings is/are arranged in a rotor bearing housing. The interior space between the rotor bearing housing and the rotor shaft is sealed by a seal arrangement with respect to the surrounding area.

SUMMARY

It is desirable to specify a seal arrangement which makes reliable operation possible. In addition, it is desirable to specify a wind energy system which makes reliable operation possible. In addition, it is desirable to specify a method which makes reliable operation possible.

In order to mount a rotatable shaft, bearings such as, for example, anti-friction bearings or plain bearings are used. The mounting of a rotatable shaft takes place by way of one (or more) bearing/bearings which is/are arranged within a bearing housing. The bearing is therefore situated in an interior space between the bearing housing and the rotatable shaft. In order to reduce the friction and wear in the bearing, the bearing is supplied with lubricant, for example with lubricating grease or with lubricating oil. The interior space between the bearing housing and the rotatable shaft is sealed axially with the aid of a seal arrangement, in order to prevent an uncontrolled lubricant discharge from the interior space into the surrounding area. For example, this seal arrangement extends radially out of the bearing housing with respect to the rotatable shaft. This ensures that a sufficient quantity of lubricant is situated in the interior space, with the result that a lack of lubrication of the bearing is avoided.

In accordance with an embodiment, a seal arrangement for a bearing for sealing an interior space between a bearing housing and a rotatable shaft with respect to a surrounding area has:
a seal body which can be fastened to the bearing housing with a first end and a second end, the seal body being extended in an elongate manner along a main extent direction and being configured to be arranged in an annular manner around the rotatable shaft in a mounted state, with the result that the first end and the second end have a common butt joint,
a projecting region which is arranged at the first end of the seal body and projects tangentially with respect to the rotatable shaft in the direction of a predefined main rotational direction of the rotatable shaft, with the result that the projecting region projects beyond the seal body and overlaps the butt joint on a side which faces the interior space.

The projecting region covers the butt joint, with the result that lubricating grease or other lubricant does not pass or passes only slightly from the interior space to the butt joint during operation and cannot usually penetrate the butt joint. The projecting region covers the butt joint, with the result that there is no rectilinear, simple passage for the lubricant through the seal body.

The projecting region overlaps the butt joint in such a way that the lubricant is moved away from the butt joint via the projecting region during operation on account of the rotation of the rotatable shaft and the lubricant which adheres to it. For example, the projecting region extends in an elongately extended manner along the main extent direction tangentially with respect to the rotatable shaft in the direction of the predefined main rotational direction of the rotatable shaft by from 10 to 20 mm beyond the first end of the seal body. Other dimensions are also possible; for example, the projecting region has a length of between 10 and 50 mm, in particular a length of between 10 and 30 mm. The seal arrangement with the projecting region makes it possible that from little lubricant to as far as possible no lubricant at all passes outward out of the interior space in an undesired manner during operation. Moreover, the seal arrangement thus prevents or decreases an undesired lubricant discharge even at a standstill. Therefore, in the mounted state the interior space is sealed reliably on account of the overlapped butt joint both at a standstill and during operation, and the bearing is therefore lubricated reliably. This contributes to reliable operation of the bearing and the wind energy system.

In accordance with at least one further embodiment, the seal body is formed from at least two seal segments. For example, the seal body is formed from two seal segments, from three seal segments, from four seal segments or more which can enclose the rotatable shaft completely in an annular manner in each case in a combined way.

The seal segments in each case have a first end and a second end. The seal segments are configured to be arranged in an annular manner around the rotatable shaft in each case in a combined way in the mounted state, with the result that in each case one first end of the seal segment and one second end of the directly adjacent seal segment form a common butt joint. A projecting region is arranged in each case at the first end. The respective projecting region projects along the main extent direction tangentially with respect to the rotatable shaft in the direction of the predefined main rotational direction of the rotatable shaft, with the result that it projects in each case beyond the respective seal segment and overlaps the respective associated butt joint on a side which faces the interior space. The configuration of the seal body from a plurality of seal segments makes, for example, simpler production and mounting of the seal body possible. On account of the reliable covering of the butt joints, reliable sealing of the interior space despite an increased number of butt joints is still possible. An undesirably excessive discharge of the lubricant through the butt joints is avoided by way of the respective associated projecting region even in the case of a plurality of butt joints, for example two, three or four butt joints.

In accordance with at least one further embodiment, the seal body is formed from at least two seal segments and at least one seal intermediate piece. The seal segments and the seal intermediate piece are configured to be arranged together in an annular manner around the rotatable shaft in a mounted state, with the result that the first end of the first seal segment and a second end of the seal intermediate piece form a common butt joint. A first end of the seal intermediate piece and the second end of the second seal segment form a common butt joint. The first end of the second seal segment and the second end of the first seal segment form a common butt joint.

A projecting region is arranged in each case at the first end of the seal segments, which projecting region projects along the main extent direction tangentially with respect to the rotatable shaft in the direction of a predefined main rotational direction of the rotatable shaft. A projecting region is arranged at the first end of the seal intermediate piece, which projecting region projects tangentially with respect to the rotatable shaft in the direction of a predefined main rotational direction of the rotatable shaft, with the result that the projecting region of the first seal segment projects beyond the seal intermediate piece, the projecting region of the seal intermediate piece projects beyond the second seal segment, and the projecting region of the second seal segment projects beyond the first seal segment. In this way, the respective projecting regions overlap the respective associated butt joint on a side which faces the interior space.

The seal intermediate piece makes, for example, retrofitting of the seal arrangement to a wind energy system which already exists possible. The seal segments which are, for example, already present could be machined, for example via blades, in order to configure the projecting regions. The seal segments are machined in each case at one of their ends, in particular at their first end, in order to configure the projecting regions. It is also possible, for example, for the seal segments to be machined at the respective second end and then for the seal segments to be turned around.

The shortening of the seal segments which occurs as a result of the machining is filled via the seal intermediate piece. The seal segments and the seal intermediate piece therefore together surround the rotatable shaft completely. The respective projecting regions overlap the butt joints in such a way that the lubricant is moved away from the respective butt joints via the projecting region during operation on account of the rotation of the rotatable shaft and the lubricant which adheres to it.

In accordance with at least one further embodiment, the seal body has a fastening region. The fastening region can be fastened to the bearing housing via a seal carrier. The seal body has a radially projecting sealing lip which bears against the rotatable shaft. The projecting region is arranged on the sealing lip on the side which faces the interior space. For example, the seal body has a further sealing lip, with the result that the seal body with the fastening region and the two sealing lips is configured, for example, in the manner of a Y-shaped seal. A sealing lip which faces the interior space in the mounted state has the projecting region. This sealing lip serves, in particular, to avoid it being possible for lubricant to pass from the interior space to the outside. The sealing lip which faces away from the interior space in the mounted state is also called a dust lip and serves, in particular, to avoid it being possible for contaminants to pass from the surrounding area to the interior space.

In accordance with at least one further embodiment, the projecting region is a structural element which is separate from the seal body. The projecting region is connected as a separate structural element to the seal body at the first end. For example, the projecting region is connected to the seal body via an adhesive bond. During the production, the projecting region and the seal body, in particular the seal segment, are structural elements which are separate from one another and are connected to one another. In this embodiment, the projecting region covers the butt joint, for example, in a stepped manner.

In accordance with at least one further embodiment, the projecting region and the seal body are configured in one piece with one another. For example, the projecting region is formed from the seal body via cutting. In particular, the projecting region is configured from the seal segment via cutting. The projecting region and the seal body, in particular the seal segment, are configured as a common body and structural element without an additional subsequently configured connection. The projecting region is an integral constituent part of the seal body, in particular of the seal segment. In this embodiment, the projecting region covers the butt joint, for example, in a ramp-shaped manner.

In accordance with at least one embodiment, a wind energy system has a rotor shaft which can be rotated about a rotational axis. The wind energy system has a bearing for mounting the rotor shaft. The wind energy system has a seal arrangement in accordance with one of the embodiments described herein. The seal body of this seal arrangement is arranged coaxially with respect to the rotational axis around the rotor shaft. The seal body is arranged axially at a first end of the rotor bearing housing in relation to the rotational axis.

The seal arrangement is configured to seal the interior space. The seal arrangement is, in particular, in direct contact with the rotor shaft and serves to avoid a discharge of lubricant from the interior space along the rotor shaft. In addition, the seal arrangement serves, for example, to avoid a penetration of dirt and foreign bodies from outside into the interior space. The projecting region of the seal arrangement bears against the rotor shaft and covers the butt joint on the rotor shaft, with the result that lubricant does not pass unintentionally in a relatively large quantity to the butt joint, and it does not pass through the butt joint to the outside. The lubricant is held reliably in the interior space.

In this way, a reliable lubricating bearing is realized, and reliable operation of the wind energy system is made possible.

In accordance with at least one embodiment, the rotor shaft of the wind energy system has the predefined main rotational direction. The main rotational direction corresponds, in particular, to the rotational direction, in which the rotor shaft rotates most of the time during operation, in order to generate a drive torque from the wind energy. The projecting region projects tangentially with respect to the rotor shaft in the direction of the main rotational direction, and covers the butt joint, with the result that the lubricant which adheres to the rotor shaft is pushed by way of the rotor shaft along the main rotational direction during operation and is pushed beyond the butt joint on account of the projecting region and its orientation along the main rotational direction, without penetrating into the butt joint in an increased manner.

In accordance with at least one further embodiment, the seal arrangement has a further seal body which is arranged along the rotational axis axially at a second end of the rotor bearing housing, in order to seal the interior space with respect to the surrounding area at the second end of the rotor bearing housing. In this way, the interior space is reliably sealed axially in both directions along the rotor shaft, in particular in the region of the bearing.

BRIEF DESCRIPTION OF THE DRAWINGS

The invention will now be described with reference to the drawings wherein.

DESCRIPTION OF THE PREFERRED EMBODIMENTS

Figure 1:
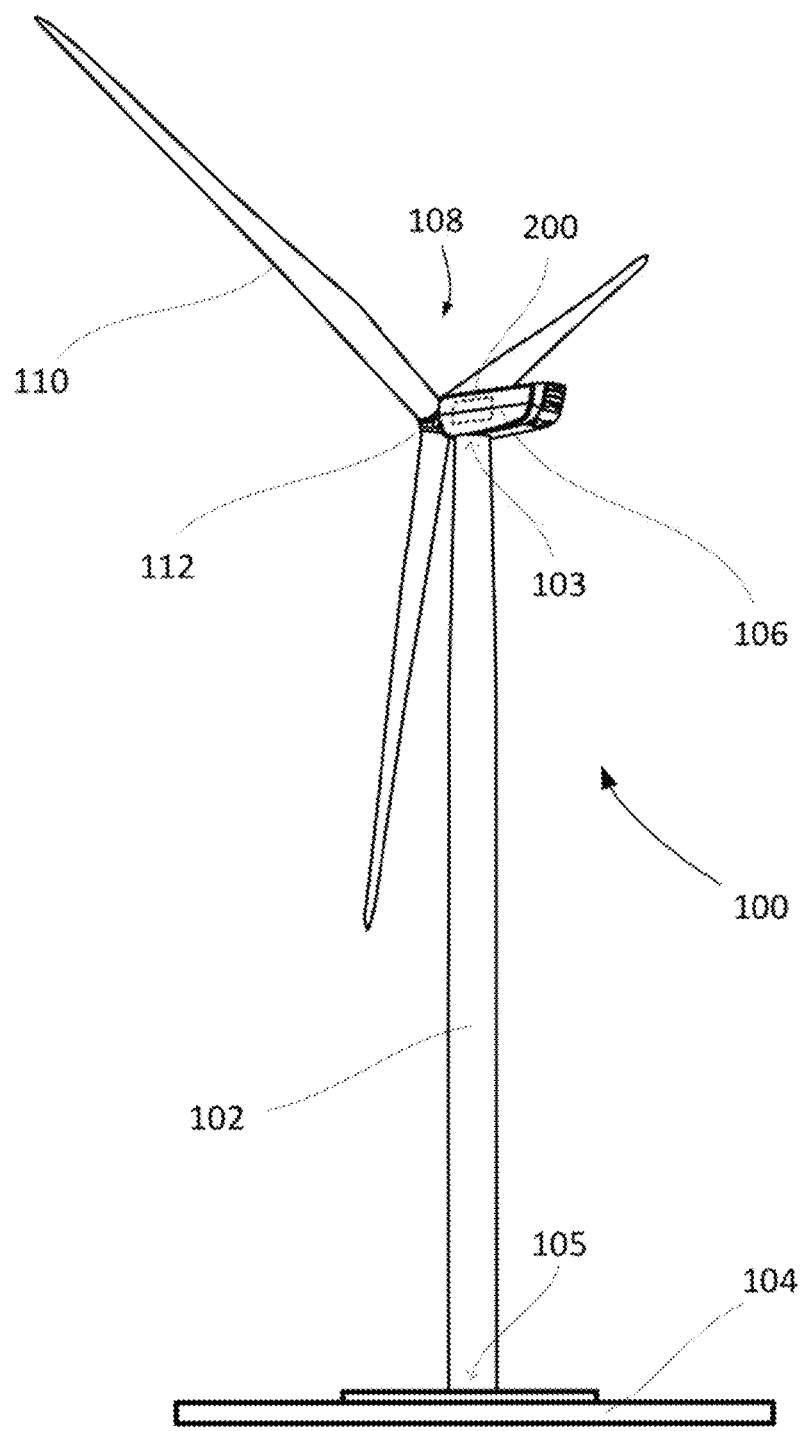
FIG. 1 shows a diagrammatic illustration of a wind energy system in accordance with an embodiment.

FIG. 1 shows a diagrammatic illustration of a wind energy system 100 in accordance with an embodiment. The wind energy system 100 has a tower 102. The tower 102 is fastened on an underlying surface at a second end 105 of the tower 102 via a foundation 104. A nacelle 106 is mounted rotatably at a first end 103 of the tower 102, which first end 103 lies opposite the underlying surface. The nacelle 106 has, for example, a generator which is coupled via a drive train to a rotor 108. The drive train has, for example, a rotor shaft 109 (FIG. 2), a transmission, a clutch, a rotor brake and other components.

The rotor 108 has, for example, one or more rotor blades 110 which are arranged on a rotor hub 112. The rotor hub 112 is in turn connected to the rotor shaft 109. The rotor shaft 109 is mounted rotatably in the nacelle 106 in a rotor bearing housing 115 via a bearing 201 (FIG. 2) or a plurality of bearings 201.

Figure 2:
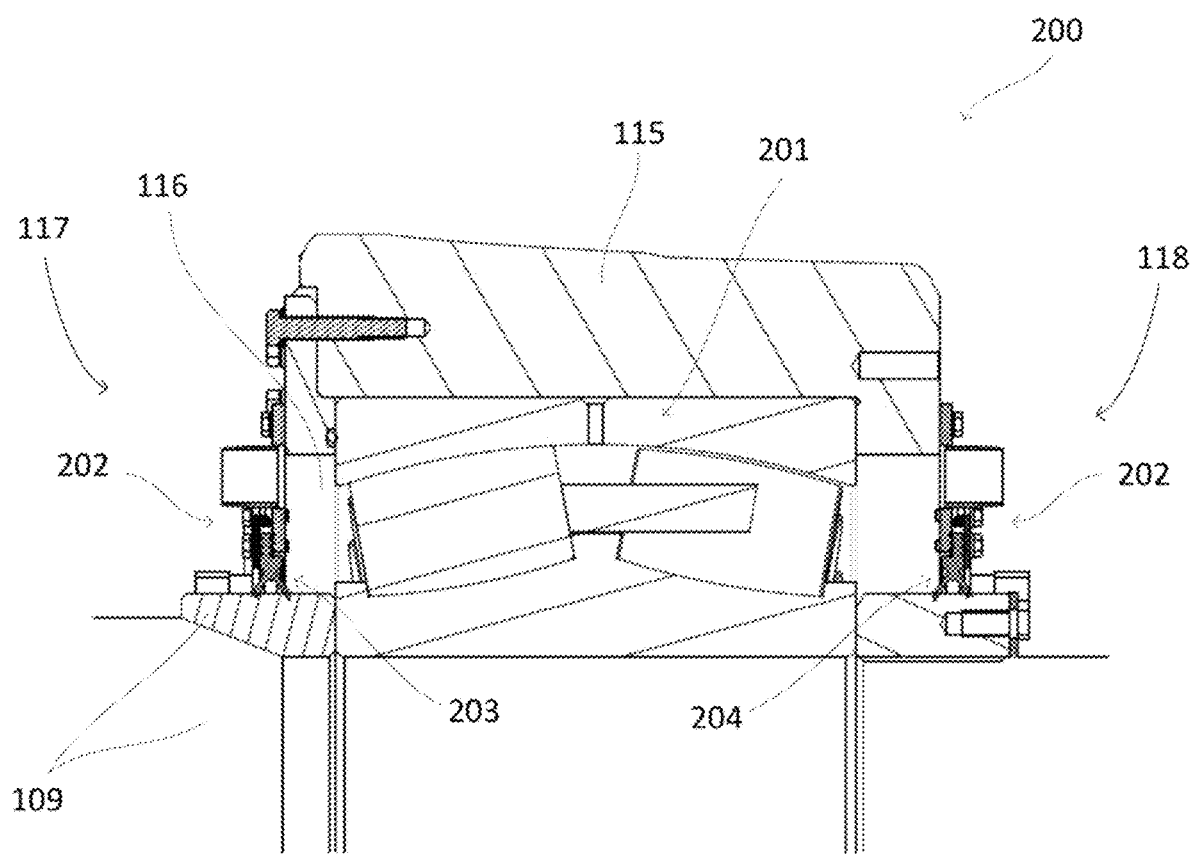
FIG. 2 shows a diagrammatic illustration of a part of the wind energy system in accordance with an embodiment.

FIG. 2 shows a diagrammatic illustration of a part of a bearing arrangement of the wind energy system in the nacelle 106. The rotor shaft 109 extends in an elongately extended manner along the rotational axis 101. The rotor shaft 109 can be rotated about the rotational axis 101 during operation. The rotor shaft 109 is mounted in the rotor bearing housing 115 via an anti-friction bearing 201, in particular a self-aligning roller bearing as shown. The anti-friction bearing 201 is therefore arranged within an interior space 116 between the rotor bearing housing 115 and the rotor shaft 109. The anti-friction bearing 201 makes rotation, which is as low-friction as possible, of the rotational axis 101 relative to the rotor bearing housing 115 possible.

The interior space 116 is sealed via seal bodies 203, 204. The seal bodies 203, 204 are fastened to the rotor bearing housing 115 via seal carriers 202. In relation to the rotational axis 101, the first seal body 203 is arranged axially at a first end 117 of the rotor bearing housing 115. In particular, the first seal body 203 is arranged on a side of the rotor bearing housing 115, which side faces the rotor 108. In relation to the rotational axis 101, the second seal body 204 is arranged axially at a second end 118 of the rotor bearing housing 115.

In particular, the second seal body 204 is arranged on a side of the rotor bearing housing 115, which side faces away from the rotor 108. The seal bodies 203, 204 are part of a seal arrangement 200 for sealing the interior space 116 between the rotor bearing housing 115 and the rotor shaft 109.

The two seal bodies 203, 204 seal the interior space 116 to the outside. For this purpose, the seal bodies 203, 204 in each case surround the rotor shaft 109 along the circumference of the rotor shaft 109, and bear against the rotor shaft 109.

In particular, the seal bodies 203, 204 can either bear directly against the rotor shaft 109, or against a running ring which surrounds the rotor shaft 109 (as shown). The seal bodies 203, 204 are configured in each case to avoid penetration of contaminants from outside into the interior space 116. In addition, the seal bodies 203, 204 are configured in each case to avoid a discharge of lubricant from the interior space 116 to the outside.

Figure 3:
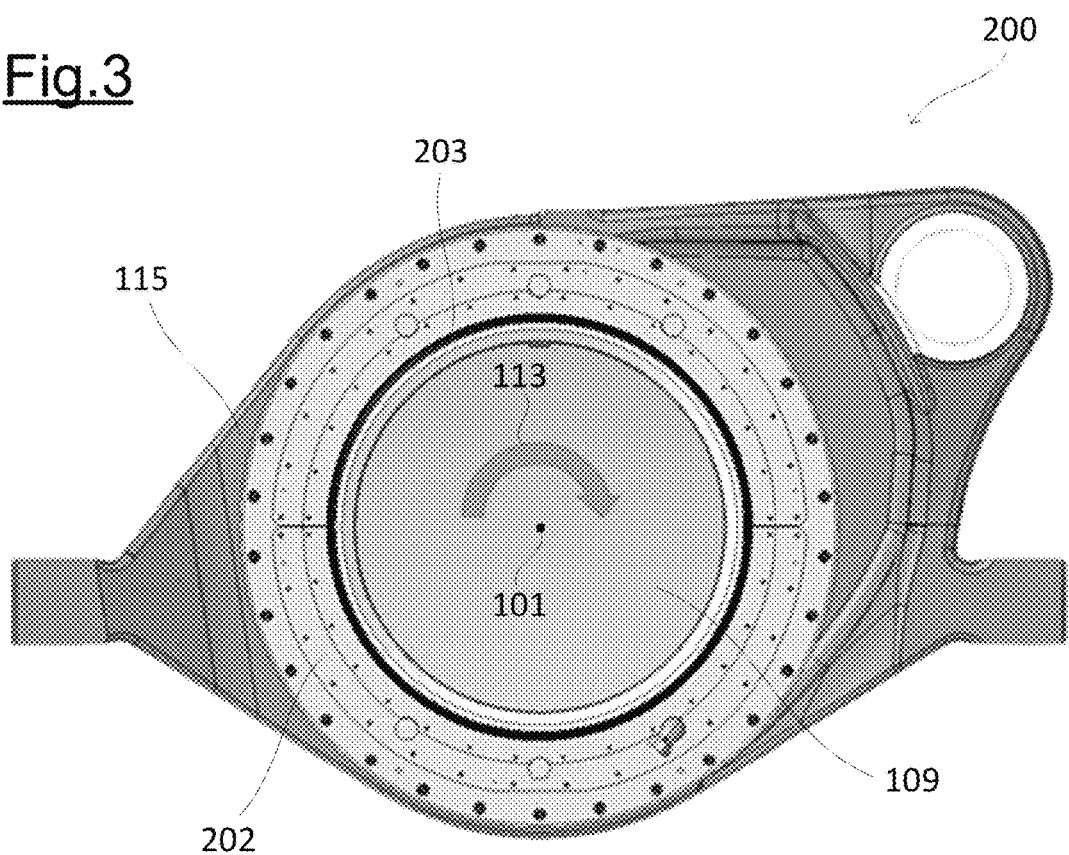
FIGS. 3 to 6 show diagrammatic illustrations of seal arrangements in accordance with embodiments.

FIG. 3 shows an illustration of the part of the bearing arrangement of FIG. 2 as viewed from the first end 117 of the rotor bearing housing 115, that is, as viewed from the rotor 108. In this view, the rotor shaft 109 rotates in a main rotational direction 113 in the clockwise direction during operation.

Figure 4:
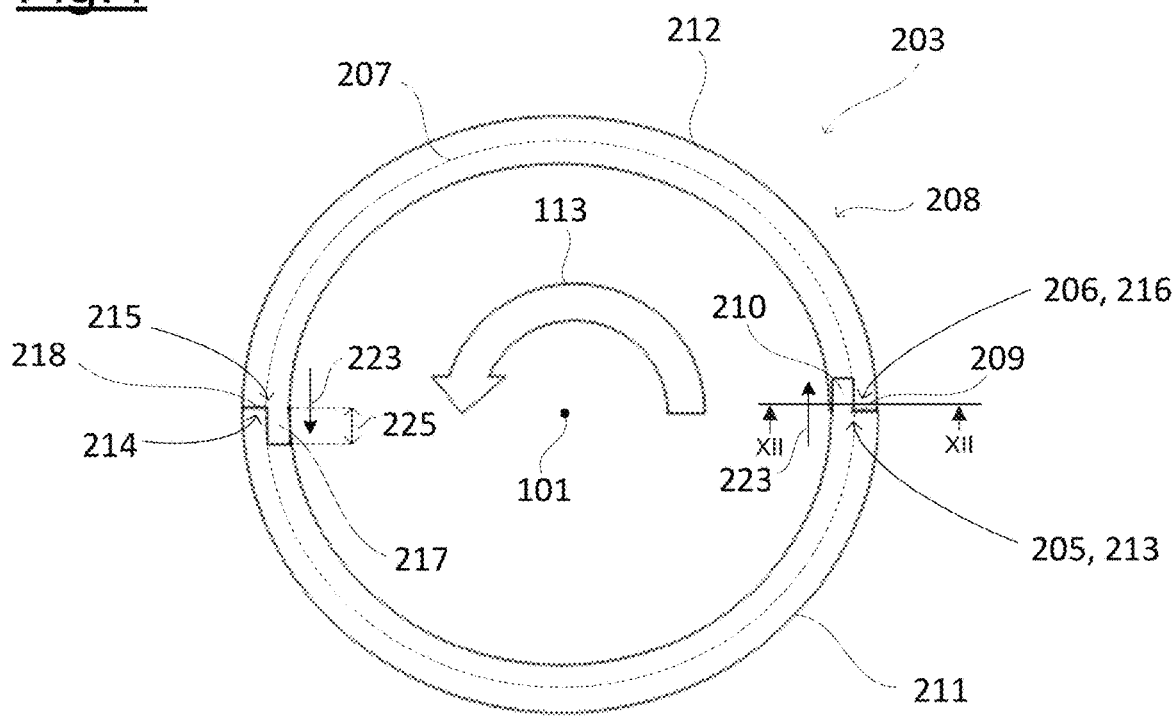

FIG. 4 shows a diagrammatic illustration of the seal body 203 of FIG. 3 as viewed from the interior space 116 in the direction of the rotor 108. In this view, the rotor shaft rotates during operation in a main rotational direction 113 which is arranged counter to the clockwise direction. The seal body 203 has, for example, a first seal segment 211 and a second seal segment 212. The seal segments 211, 212 are in each case of semicircular configuration, with the result that the two seal segments 211, 212 can together completely surround the rotor shaft 109 in an annular manner. The seal segments 211, 212 are, in particular, of identical construction.

The first seal segment 211 has a first end 213 and an opposite second end 214. The first end 213 of the first seal segment 211 corresponds, for example, to a first end 205 of the seal body 203.

The second seal segment 212 correspondingly has a first end 215 and a second end 216. The second end 216 of the second seal segment 212 corresponds, for example, to a second end 206 of the seal body 203.

The seal segments 211, 212 extend in each case in an elongately extended manner between the associated first ends 213, 215 and the associated second ends 214, 216 along a main extent axis 207. Along the main extent axis 207 which runs, in particular, in an annular manner, the seal segments 211, 212 in each case have a considerably longer extent than transversely with respect to the main extent axis 207. The seal body 203 and the seal segments 211, 212 are configured along an annular shape 208, in order for it to be possible for the rotor shaft 109 to be surrounded in an annular manner.

A projecting region 210 is configured at the first end 213 of the first seal segment 211. The projecting region of the first seal segment 211 projects along the main extent axis 207 beyond the first end 213, with the result that the projecting region 210 projects beyond the first end 213.

Correspondingly, a further projecting region 217 is configured at the first end 215 of the second seal segment 212, which further projecting region 217 projects beyond the first end 215 of the first projecting region 210.

The seal segments 211, 212 are configured such that, in the mounted state, the first end 213 of the first seal segment 211 together with the second end 216 of the second seal segment 212 configure a common butt joint 209. At the butt joint 209, the first end 213 and the second end 216 are in direct contact with one another or are arranged so as to lie at least indirectly opposite one another in the mounted state.

Correspondingly, the seal body 203 is configured such that, in the mounted state, the first end 205 of the seal body 203 together with the second end 206 of the seal body 203 configure the common butt joint 209. At the butt joint 209, the first end 205 and the second end 206 are in direct contact with one another or are arranged so as to lie at least indirectly opposite one another in the mounted state.

Correspondingly, the first end 215 of the second seal segment 212 and the second end 214 of the first seal segment 211 are configured to configure a further common butt joint 218 with one another. Therefore, the two seal segments 211, 212 are configured to jointly enclose and to seal the rotor shaft 109. The butt joints 209, 218 can be insufficiently tight on account of tolerances, mounting inaccuracies or ageing effects. Moreover, the lubricant can accumulate locally at the butt joints 209, 218 as a result of the rotation of the rotatable shaft, with the result that dynamic pressure effects are produced. Without the projecting regions 210, 217, lubricant might thus pass along the butt joints 209, 218 through the seal arrangement 200 to the outside. In order to avoid this, the projecting regions 210, 217 are provided which, in the ready for operation state, cover the respective associated butt joint 209, 218 on a side which faces the rotor shaft 109 radially. To this end, the projecting region 210 of the first seal segment 211 projects along a tangential direction 223, with the result that the projecting region 210 of the first seal segment 211 projects as far as beyond the second end 216 of the second seal segment 212 and therefore reaches as far as beyond the second end 216 of the second seal segment 212. Correspondingly, the projecting region 217 of the second seal segment 212 projects along the tangential direction 223, with the result that the projecting region 217 of the second seal segment 212 projects as far as beyond the second end 214 of the first seal segment 211 and therefore reaches as far as beyond the second end 214 of the first seal segment 211. The tangential direction 223 relates, in particular, to the circumference of the rotor shaft 109.

Figure 8:
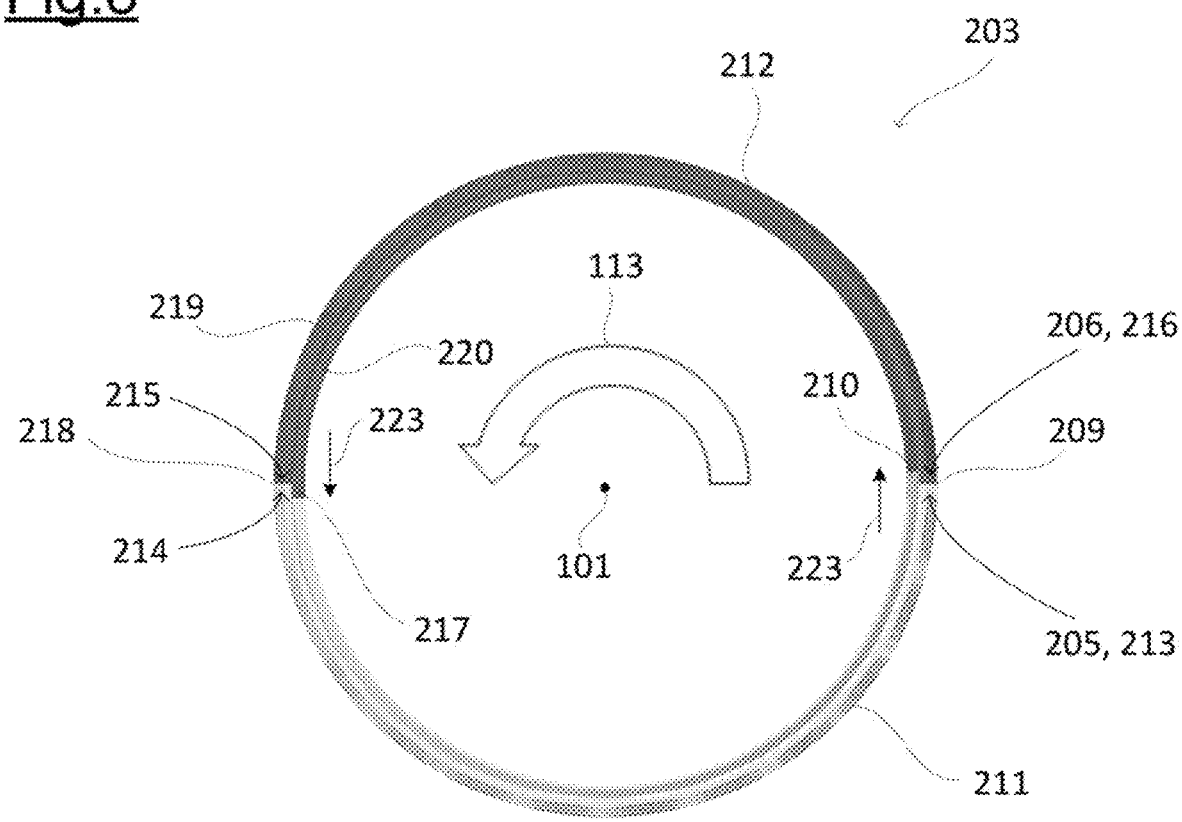
FIGS. 8 to 11 in each case show diagrammatic illustrations of seal bodies in accordance with embodiments.

In the embodiment which is shown, the projecting regions 210, 217 are configured in each case, for example, in one piece with the associated seal segment 211, 212. For example, the projecting regions 210, 217 are formed in each case from the associated seal segments 211, 212 via cutting. In this embodiment, the projecting region 210 of the first seal segment 211 covers the abutting interface 209 in a ramp-shaped manner and overlaps the second end 216 of the second seal segment 212. The projecting region 217 of the second seal segment 212 likewise covers the abutting interface 218 in a ramp-shaped manner and overlaps the second end 214 of the first seal segment 211. A separate configuration is also possible, in the case of which the projecting regions 210, 217 are fastened in each case to the associated seal segment 211, 212, for example, via an adhesive bond (FIG. 8).

Figure 12:
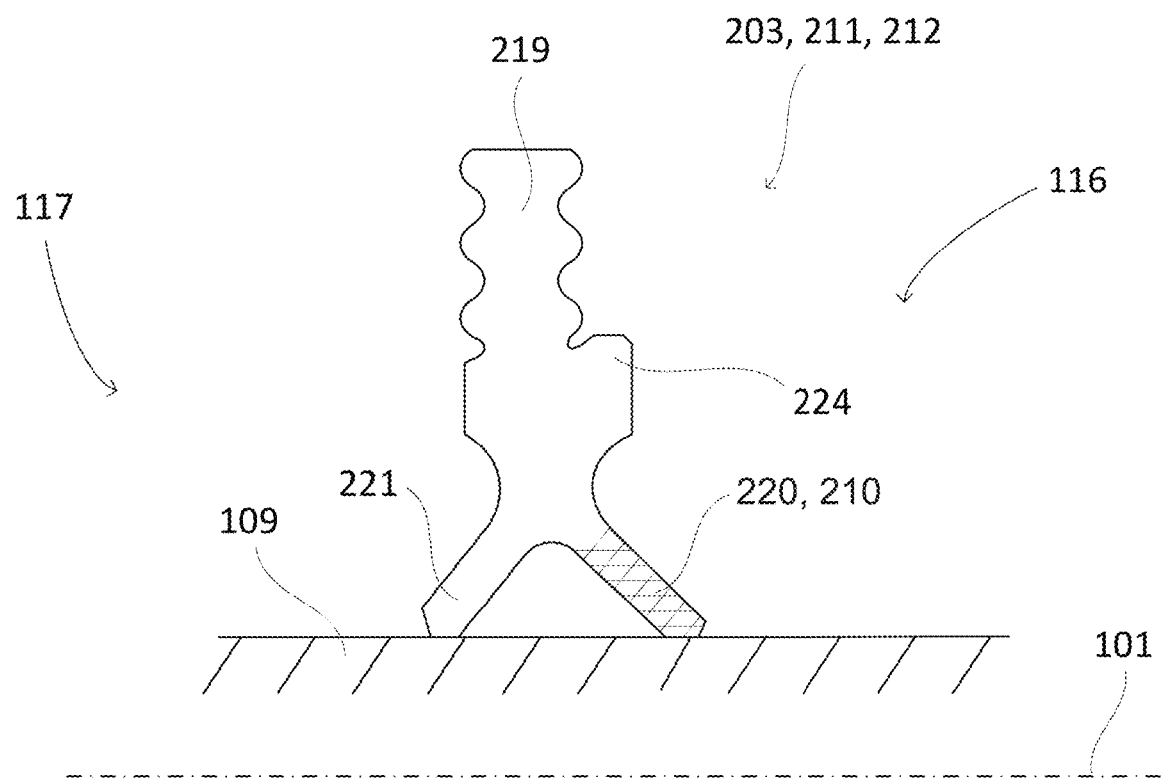
FIG. 12 is a section view along line XII-XII of FIG. 4 showing a projecting region as part of a sealing lip.

FIG. 12 shows that portion of the seal segment which forms the projecting region. Referring to FIG. 12, the sealing lip is cross-hatched to show that this is the sealing lip which defines the projecting region.

Figure 5:
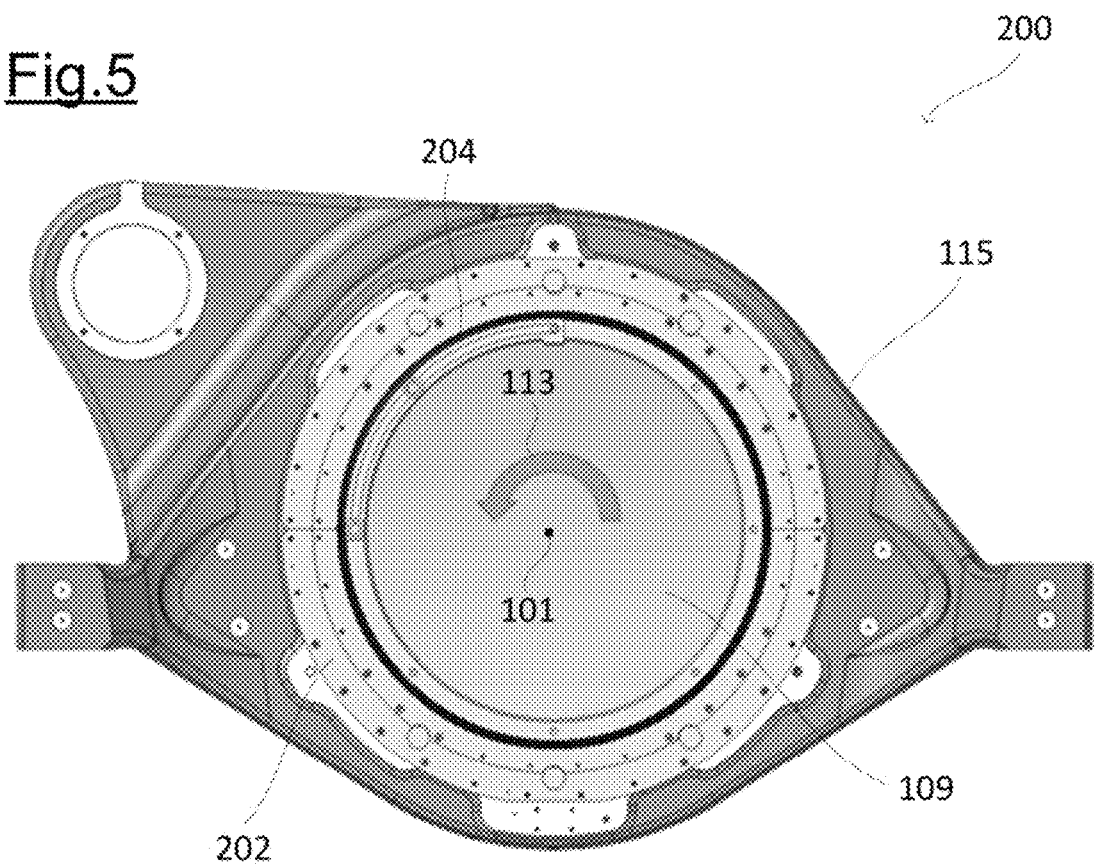

FIG. 5 shows an illustration of the part of the bearing arrangement of FIG. 2 as viewed toward the second end 118 of the rotor bearing housing 115, that is, as viewed from the side which faces away from the rotor 108 (transmission side or generator side depending on the drive train concept). In this view, the rotor shaft 109 rotates in a main rotational direction 113 counter to the clockwise direction during operation.

Figure 6:
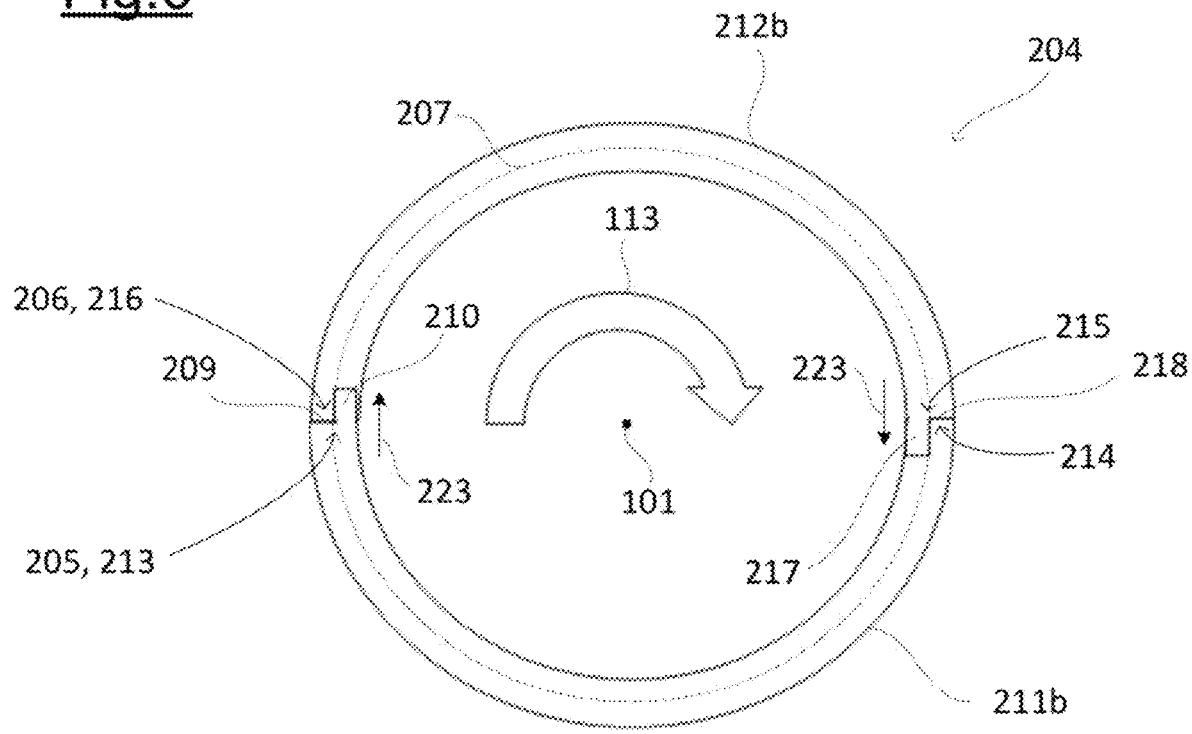

FIG. 6 shows a diagrammatic illustration of the seal body 204 of FIG. 5 as viewed from the interior space 116 in the direction of the side which faces away from the rotor 108 (that is, in the direction of the transmission side or generator side depending on the drive train concept). In this view, the rotor shaft rotates during operation in a main rotational direction 113 which is oriented in the clockwise direction. In comparison with the seal body 203 of FIG. 4, the seal body 204 is of mirror-inverted construction. The seal body 204 has, for example, a first seal segment 211b and a second seal segment 212b. The first end 213, 215 and the second end 214, 216 of the seal segments 211b, 212b are in each case swapped in comparison with the first end 213, 215 and the second end 214, 216 of the seal segments 211, 212. Correspondingly, as viewed from the interior space in the direction of the side which faces away from the rotor 108 (FIG. 6), the projecting regions 210, 217 are arranged in a precisely opposite manner in relation to the view from the interior space 216 in the direction of the rotor 108 (FIG. 4). Otherwise, the seal bodies 203, 204 are, in particular, of identical construction, with the result that features, advantages and embodiments of the seal body 203 also apply to the other seal body 204. The seal bodies 203, 204 are constructed in such a way that the projecting regions 210, 217 project both on the rotor side and on the transmission or generator side in each case along the main rotational direction 113 beyond the butt joint. This ensures that the respective projecting regions 210, 217 keep the lubricant as far as possible away from the butt joints 209, 218.

Figure 7:
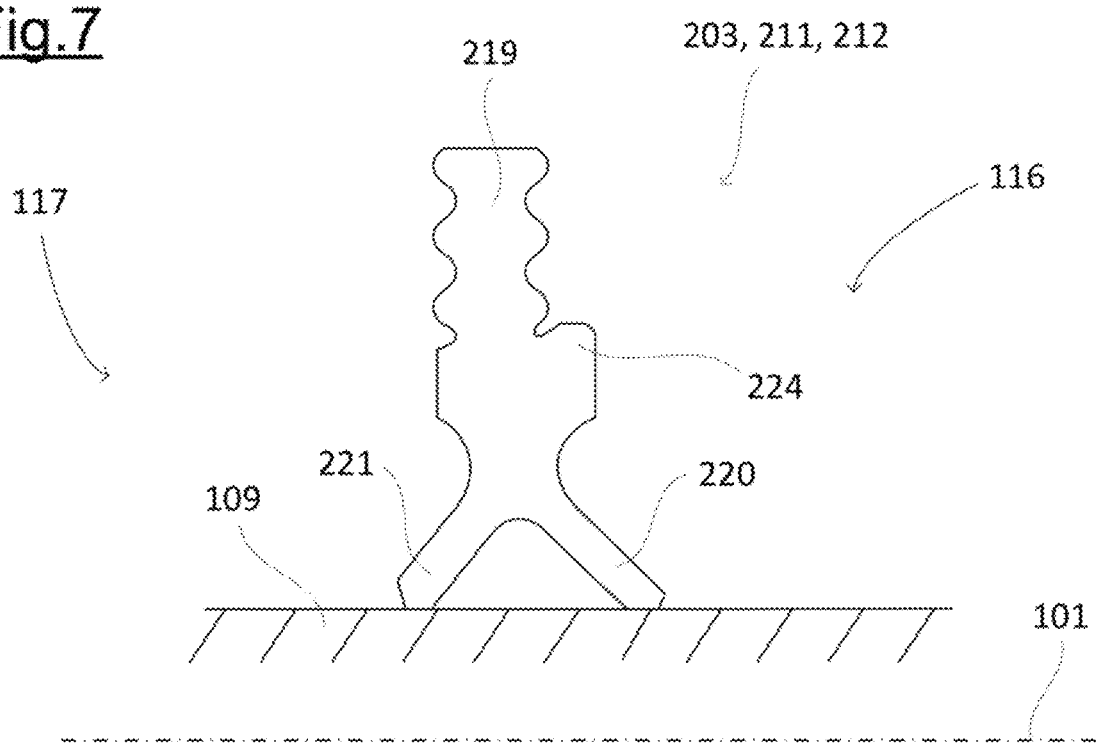
FIG. 7 shows a diagrammatic sectional view of a seal body in accordance with an embodiment.

FIG. 7 shows a diagrammatic illustration of the seal segments 211, 212 of the seal body 203 in a sectional view transversely with respect to the rotational axis 101. The seal segments 211, 212 of the seal body 203 are, in particular, of identical configuration. The seal segments 211, 212 in each case have a fastening region 219. The latter serves, in particular, to fasten the seal segments 211, 212 to a respective associated seal carrier 202 (FIG. 2, FIG. 3). The seal segment 211, 212 can be fastened to the rotor bearing housing 115 via the seal carrier 202. A first sealing lip 220 is arranged on the fastening region 219 so as to face the rotor shaft 109 radially. A further sealing lip 221 is provided axially along the rotor shaft 109 next to the first sealing lip 220. The first sealing lip 220 faces the interior space 116 between the rotor bearing housing 115 and the rotor shaft 109 axially. The further sealing lip 221 faces an outer side axially, in particular the side 117 which faces the rotor 108.

The sealing lip 220 which faces the interior space 116 in each case has the projecting region 210 or 217. The projecting region 210, 217 is assigned on the sealing lip 220 which primarily comes into contact with the lubricant. For example, no projecting region is configured on the further sealing lip 221.

The seal segments 211, 212 in each case have a shoulder 224. The first sealing lip 220 and the further sealing lip 221 which bear in each case against the rotor shaft 109 are prestressed on the rotor shaft 109 in a defined manner by way of the shoulder 224, with the result that a discharge of lubricant between the respective sealing lips 220, 221 and the rotor shaft 109 is reduced or even prevented.

The embodiment of FIG. 7 also applies to the seal body 204 which is arranged on the side which faces away from the rotor 108 (mirror-inverted). The seal segments 211b, 212b of the seal body 204 are, in particular, of corresponding configuration with respect to the seal segments 211, 212 of the seal body 203.

In accordance with further embodiments, the seal segments 211, 212 have different cross sections, and have, for example, only one sealing lip 220 and no further sealing lip 221.

FIG. 8 shows a diagrammatic illustration of the seal segments 211, 212 of the seal body 203 in accordance with a further embodiment as viewed from the interior space 116 in the direction of the rotor 108. In this embodiment, the projecting regions 210, 217 are separate structural elements which are connected in each case to the first end 213, 215 of the associated seal segments 211, 212. The projecting regions 210, 217 are fastened to the associated seal segment 211, 212 in each case, for example, via an adhesive bond. The projecting regions 210, 217 are initially of separate configuration from the seal segments 211, 212 during the production, and are then connected to the associated seal segments 211, 212 via adhesive bonding. Other fastening types are also possible which have a sufficient resistance to the lubricants which are used during operation.

In this embodiment, the projecting regions 210, 217 are connected to the associated seal segments 211, 212, in particular in each case to the sealing lip 220 of the associated seal segments 211, 212 on the side which faces the interior space 116. The projecting region 210 of the first seal segment 211 covers the abutting interface 209 in a stepped manner and overlaps the second end 216 of the second seal segment 212. The projecting region 217 of the second seal segment 212 likewise covers the abutting interface 218 in a stepped manner and overlaps the second end 214 of the first seal segment 211.

The embodiment of FIG. 8 also applies correspondingly to the seal body 204 which is arranged on the side which faces away from the rotor 108 (mirror-inverted).

Figure 9:
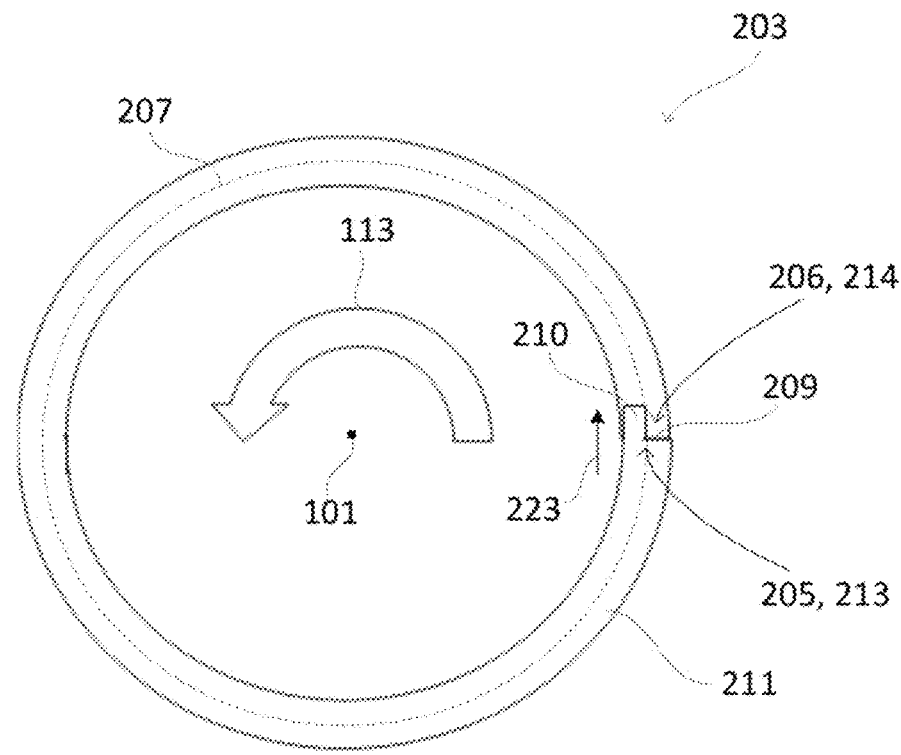

FIG. 9 shows the seal body 203 in accordance with a further embodiment. The seal body 203 has only a single seal segment 211. The projecting region 210 is configured at a first end 205 of the seal body 203 which corresponds, in particular, to the first end 213 of the seal segment 211. The projecting region 210 overlaps a second end 206 of the seal body 203 which corresponds, in particular, to the second end 214 of the seal segment 211. Therefore, the seal body 203 has only a single butt joint 209.

In the embodiment shown in FIG. 9, the projecting region 210 and the seal segment 211 are configured in one piece with one another. For example, the seal segment 211 is cut off at the first end 213 in such a way that merely the projecting region 210 of the sealing lip 220 remains and, for example, the further sealing lip 221 and the fastening region 219 are removed. It is of course also possible in accordance with further embodiments, in the embodiment according to FIG. 9 with only a single seal segment 211, for the projecting region 210 to be connected as a separate structural element subsequently to the seal segment 211, in particular to be adhesively bonded.

The projecting region 210 is arranged on or defined by the sealing lip 220 on the side facing the interior space 116 of the bearing housing 115. The seal segment 211 is cut off at the first end 213 in such a way that the projecting region 210 of the sealing lip 220 remains.

The embodiment of FIG. 9 also applies correspondingly to the seal body 204 which is arranged on the side which faces away from the rotor 108 (mirror-inverted).

Figure 10:
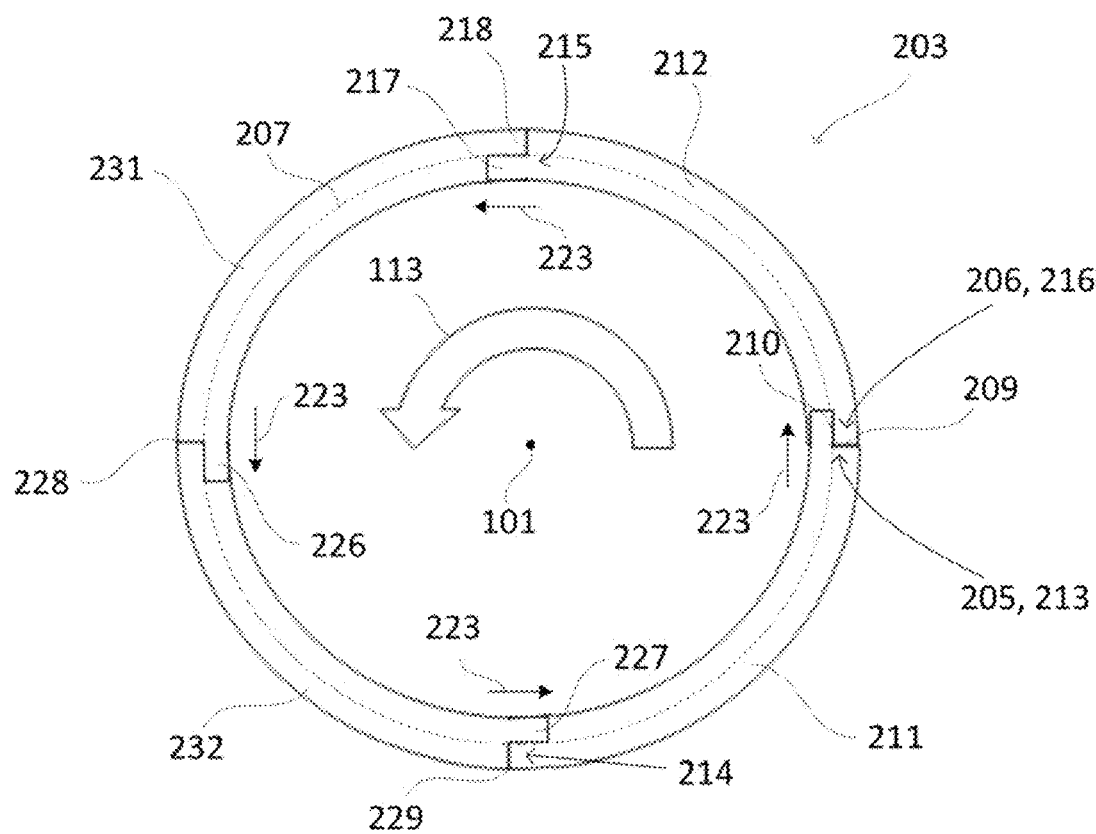

FIG. 10 shows the seal body 203 in accordance with a further embodiment. The seal body 203 has four seal segments 211, 212, 231, 232 which are configured to together enclose the rotor shaft 109 completely in an annular manner. The respective butt joints 209, 218, 228, 229 are covered on the inner side by an associated projecting region 210, 217, 226, 227. The projecting regions 210, 217, 226, 227 project in each case along the main rotational direction 113 along the tangential direction 223.

The embodiment of FIG. 10 also applies correspondingly to the seal body 204 which is arranged on the side which faces away from the rotor 108 (mirror-inverted).

In accordance with further embodiments, further numbers of seal segments 211, 212 are also possible which together surround the rotor shaft 109 in an annular manner, in particular three seal segments 211, 212, five seal segments 211, 212 or more seal segments 211, 212. The seal segments 211, 212 which together surround the rotor shaft 109 in an annular manner can all be of identical length, with the result that they in each case cover a ring segment of identical size, or the seal segments 211, 212 can be of different length with respect to one another and cover ring segments of different length which together form a complete ring of 360°.

In the various embodiments, it is possible that the respective projecting regions 210, 217 are configured in each case in one piece with the associated seal segment 211, 212, or that the projecting regions 210, 217 are adhesively bonded or connected in some other way in each case to the associated seal segment 211, 212. Mixtures are also possible; for example, the projecting region 210 of one of the seal segments 211 is connected via the adhesive bond, and another projecting region 217 is connected in one piece to the associated seal segment 212. The different embodiments of the figures and, in particular, the individual embodiments such as number of seal segments 211, 212 and embodiment or fastening or connecting type of the projecting regions 210, 217 can be swapped between the individual embodiments of the figures, even if this combination is not shown explicitly in the figures.

The projecting region 210, 217 is formed, in particular, from the same material as the seal segments 211, 212, in particular from a rubber. Along the main extent axis 207, the projecting region 210, 217 extends, for example, with a length 225 in a range of from 10 to 50 mm, for example of from 10 mm to 40 mm, in particular of from 10 to 30 mm (for example, FIG. 4). A longer length 225 is also possible. Between the fastening region 219 and the rotor shaft 109, the projecting region 210 has, for example, the same height as the rest of the sealing lip 220. The projecting region 210, 217 is in contact with the rotor shaft 109, at least partially, in particular during operation.

The seal arrangement 200 with the projecting regions 210, 217 which cover the respective associated abutting interface 209, 218 in such a way that lubricant is discharged from the abutting interface 209, 218 during operation makes a significant reduction of the discharge of lubricants through the seal bodies 203, 204 possible. Therefore, fewer costs for cleaning become necessary. The risk of damage of the anti-friction bearings 201 is avoided, since an insufficient supply of lubricant becomes avoidable. Other structural elements of the wind energy system 100 are protected against discharging lubricant, with the result that, for example, sensors or other electronic structural elements are not damaged. Overall, the sealing capability of the seal arrangement 200 is increased and therefore the reliability is increased.

Figure 11:
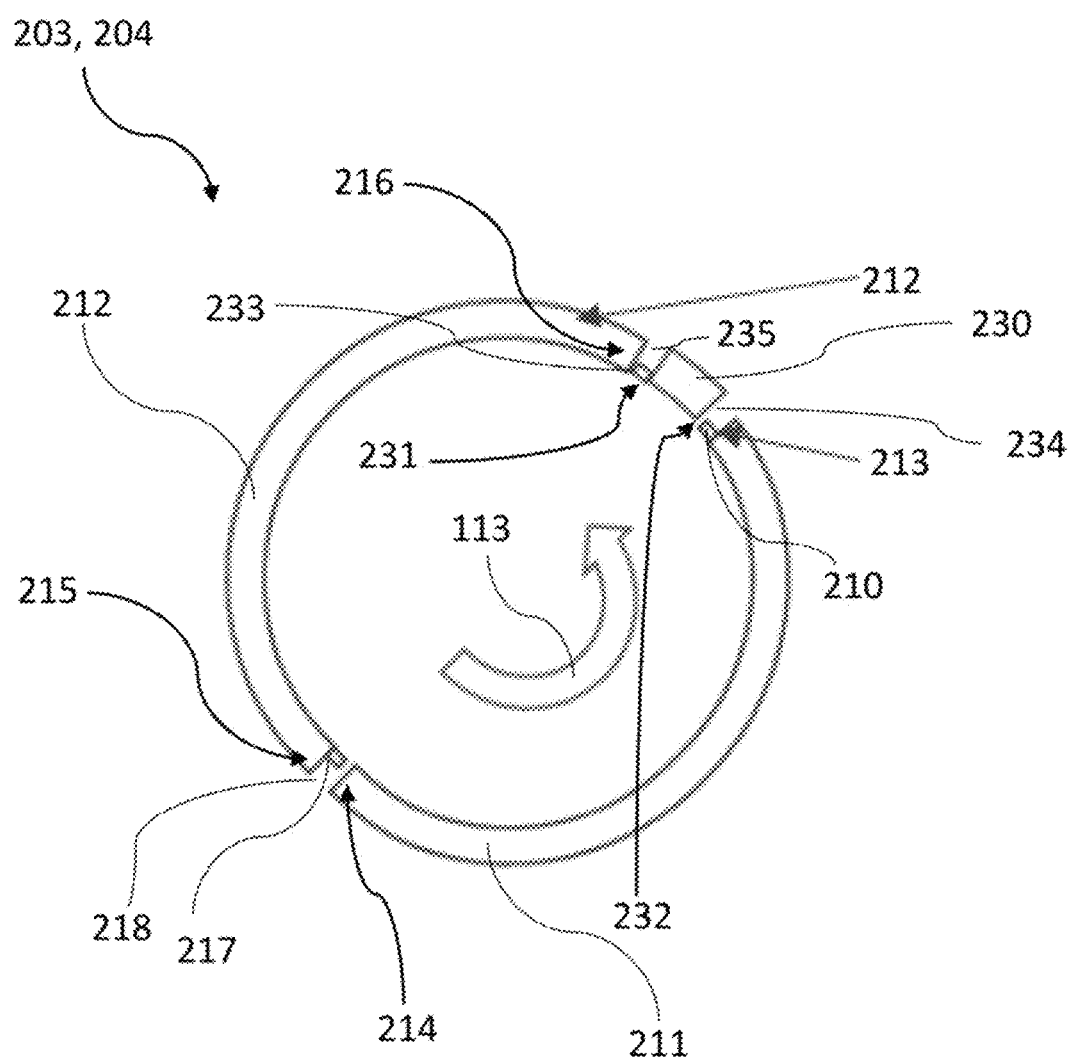

FIG. 11 shows a diagrammatic illustration of the seal body 203, 204 in accordance with a further embodiment. The seal bodies 203, 204 correspond substantially to the seal bodies 203, 204 as explained in conjunction with the preceding figures. In a distinction, the seal body 203, 204 according to FIG. 11 additionally has a seal intermediate piece 230. FIG. 11 shows, for example, the transmission-side seal body 204 as viewed from the outside in the direction toward the rotor 108.

The figure shows the seal segments 211, 212 and the seal intermediate piece 230 separately from one another. In the ready for operation state, the seal segments 211, 212 and the seal intermediate piece 230 bear directly against one another, with the result that, in the illustration, the projecting region 210, 217, 233 lies in each case behind the seal intermediate piece 230 or the seal segment 211, 212.

The seal body 203, 204 with the additional seal intermediate piece 230 can be provided both on the rotor side and on the transmission or generator side.

The seal segments 211, 212 are configured in such a way that the two seal segments 211, 212 together with the seal intermediate piece 230 can surround the rotor shaft 109 completely in an annular manner. For example, the seal intermediate piece 230 is of corresponding configuration to the seal segments 211, 212 in cross section, as shown in FIG. 7.

The further projecting region 217 is provided at the butt joint 218 of the first end 215 of the second seal segment 212 and the second end 214 of the first seal segment 211, as explained above.

In the mounted state, the first end 213 of the first seal segment 211 together with a second end 232 of the seal intermediate piece 230 configure a common butt joint 234. A first end 231 of the seal intermediate piece 230 together with a second end 216 of the second seal segment 212 configure a common butt joint 235.

A projecting region 210 is configured at the first end 213 of the first seal segment 211, as explained above. The projecting region 210 of the first seal segment 211 projects along the tangential direction, with the result that the projecting region 210 of the first seal segment 211 projects as far as beyond the second end 232 of the seal intermediate piece 230, and therefore reaches as far as beyond the second end 232 of the seal intermediate piece 230.

A projecting region 233 is provided at the first end 231 of the seal intermediate piece 230, which projecting region 233 is, in particular, of corresponding configuration to the projecting regions 210, 217. The projecting region 233 of the seal intermediate piece 230 projects along the tangential direction, with the result that the projecting region 233 of the seal intermediate piece 230 projects as far as beyond the second end 216 of the second seal segment 212, and therefore reaches as far as beyond the second end 216 of the second seal segment 212.

The projecting regions 210, 217, 233 are arranged both on the rotor side and on the transmission or generator side in each case in such a way that they project in each case along the main rotational direction 113 beyond the associated butt joint 234, 235, 218. This ensures that the respective projecting regions 210, 217, 233 keep the lubricant as far as possible away from the butt joints 234, 218, 235.

Along its longitudinal direction, the seal intermediate piece 230 has, for example, a length of at least 3 cm and at most 50 cm, in particular a length of at least 5 cm and at most 20 cm or at most 10 cm.

For example, the embodiment according to FIG. 11 is suitable for retrofitting on a wind energy system 100 which already exists. For example, the seal arrangement 200 with the overlapped butt joints is intended to be provided on the wind energy system 100. There are already seal bodies for sealing the interior space 116 on the wind energy system, the seal bodies initially not having any projecting regions 210, 217 in accordance with the present disclosure.

Figure 13:
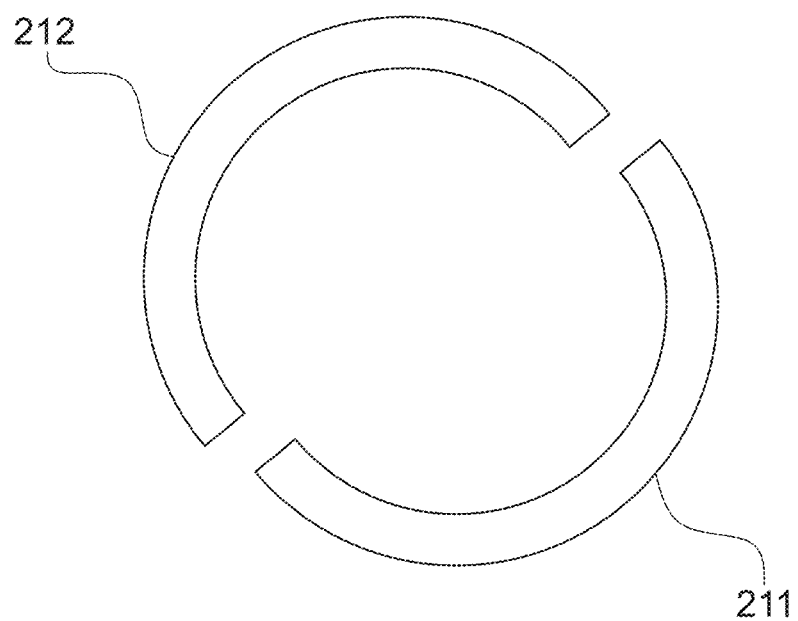
FIG. 13 shows two seal segments after release from the seal carrier.

First of all, the fastening of the seal segments 211, 212 is released, with the result that the seal segments 211, 212 can be released from the seal carrier 202. To this end, for example, what is known as a clamping plate is released which is fastened to the seal carrier 202 via screws, in order to hold the seal segments 211, 212. As noted above, the seal segments 211, 212 have no projecting regions at this point and are as shown in FIG. 13.

Figure 14:
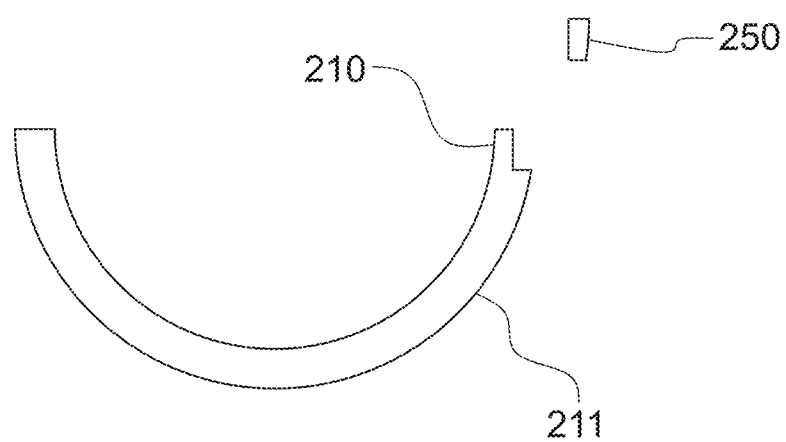
FIG. 14 shows a part removed from a seal segment to leave the projecting region.

Subsequently, a part region 250 of the seal segment 211 is removed at the first end 213 of the first seal segment 211, for example via scissors or another cutting tool, with the result that the projecting region 210 remains as in FIG. 14. In particular, the outer further sealing lip 221 is removed in regions, with the result that the sealing lip 220 which faces the interior space 116 remains, in order to configure the projecting region 210. In particular, only the sealing lip 220 which faces the interior space 116 remains. The rest of the seal, in particular the further sealing lip 221, the fastening region 219 and the shoulder 224, is removed in regions. For example, the first end 213 of the first seal segment 211 is trimmed in such a way that the sealing lip 220 which faces the interior space 116 remains with a length of approximately from 20 mm to 40 mm. The removal of the part region 250 takes place, for example, at the first end 213, 215 of the seal segments 211, 211b, 212, 212b, in order to configure the respective projecting region 210, 217 in each case at the first end 213, 215. As an alternative, the removal takes place at the respective second end, and the seal segments are then turned around.

Correspondingly, a part of the seal segment 212 is removed at the first end 215 of the second seal segment 212, with the result that the projecting region 217 remains. In particular, the outer further sealing lip 221 is removed in regions, with the result that the sealing lip 220 which faces the interior space 116 remains, in order to configure the projecting region 217. In particular, only the sealing lip 220 which faces the interior space 116 remains. The rest of the seal, in particular the further sealing lip 221, the fastening region 219 and the shoulder 224, is removed in regions. For example, the first end 215 of the second seal segment 212 is trimmed in such a way that the sealing lip 220 which faces the interior space 116 remains with a length of approximately from 20 mm to 40 mm.

In order to close the section which is missing as a result of the removal in regions in order to completely enclose the rotor shaft 109, the seal intermediate piece 230 is provided. For example, the seal intermediate piece 230 is formed from waste which accrues during the manufacture of the seal segments 211, 212, with the result that no additional material outlay is produced overall. The seal intermediate piece 230 is adapted in terms of its length before mounting in particular in each case in a manner which is dependent on the respective actually removed regions of the seal segments 211, 212, with the result that the butt joints 218, 234, 235 and the overlaps are configured reliably.

The seal segments 211, 212 and the seal intermediate piece 230 are fastened to the seal carrier 202. For example, the clamping plate is screwed again to the seal carrier 202, and the seal segments 211, 212 and the seal intermediate piece 230 are fastened between the clamping plate and the seal carrier 202. Before this, it is possible, in particular, for the seal intermediate piece 230 to be greased separately, in order to avoid dry running.

For example, the butt joints 218, 234, 235 are additionally sealed and/or adhesively bonded. This can also be dispensed with.

It is also possible that the clamping plate is formed from two or more part clamping plates, for example a lower clamping plate and an upper clamping plate. First of all, the first clamping plate is screwed, in order to at least partially fasten the seal segments 211, 212 to the seal carrier 202. Afterward, the gap between the two seal segments 211, 212 is measured, in order to adapt the length of the seal intermediate piece 230. Afterward, the seal intermediate piece 230 is introduced, and the second clamping plate is screwed, with the result that the seal segments 211, 212 and the seal intermediate piece 230 are fastened to the seal carrier. The fastening of the seal body 203, 204 to the bearing housing 115 therefore does not necessarily take place in a single, concluding method step, but rather can take place for individual seal segments 211, 212 and the seal intermediate piece 230 in a plurality of part method steps spaced apart chronologically, other method steps being carried out between the part method steps, for example.

For example, the seal segments 211, 212 are arranged in such a way that, in the mounted state, the seal intermediate piece 230 is arranged in an upper region. Therefore, the seal intermediate piece 230, on which the two butt joints 234, 235 are situated, is arranged in a region, in which the lubricant presses with less pressure from the inside against the projecting regions 210, 233 than in a lower region. In this way, the risk of a lubricant discharge can be reduced further. Since the projecting regions 210, 217, 233 reliably overlap the respective butt joint 234, 218, 235, another orientation of the seal segments 211, 212 is also possible, however.

It is also possible for the projecting regions 210, 217 to be retrofitted via adhesive bonding on the seal bodies which are already present.

It is also possible for the described method to be applied in the case of the embodiments, in the case of which the seal body has more than two seal segments before retrofitting, as shown in FIG. 10, for example. It is also possible for the described method to be applied in the case of the single-piece seal body 203, 204 with only a single seal segment 211 according to FIG. 9. In that case, there are only two butt joints 234, 235, and the butt joint 218 is not present. The seal intermediate piece 230 is then to be understood as being between the two ends 205, 206 of the seal body 203, 204.

The method of the disclosure can be summarized as set forth below. The method is for arranging a seal arrangement 200 for sealing an interior space 116 between a bearing housing 115 and a rotatable shaft 109 with respect to a surrounding area or ambient. The method includes the steps of: providing a seal body 203, 204 with a first end 205 and a second end 206, the seal body 203, 204 being extended in an elongate manner along a main extent direction 207, and the seal body 203, 204 having a projecting region 210 which is arranged at the first end 205 of the seal body 203, 204; and, fastening the seal body 203, 204 to the bearing housing 115 to cause the seal body 203, 204 to surround the rotatable shaft 109 in an annular manner, and the first end 205 and the second end 206 have a common abutting interface 209, and the projecting region 210 projects tangentially with respect to the rotatable shaft 109 in the direction of a predefined main rotational direction 113 of the rotatable shaft 109, with the result that the projecting region 210 projects beyond the seal body 203, 204 and overlaps the abutting interface 209 on a side which faces the interior space 116.

The method also includes the steps of: providing the seal body 203, 204 including dismantling of the seal body 203, 204 from the bearing housing 115 in a state in which the seal body 203, 204 does not have the projecting region 210; and, removing a part region 250 of the seal body causing the projecting region 210 to be configured.

The embodiments which are described herein relate to a seal arrangement 200 for the bearing arrangement of the rotor shaft 109 of a wind energy system. However, the seal arrangement 200 in accordance with the present disclosure can also be applied to other bearing arrangements of a wind energy system. The seal arrangement 200 can be used in every application area, in the case of which a rotatable shaft has a main rotational direction and is mounted within a bearing housing. The mounting does not necessarily have to be ensured by way of a bearing housing with an anti-friction bearing, but rather the bearing housing can in principle contain any desired number of bearings of any desired type.

It is understood that the foregoing description is that of the preferred embodiments of the invention and that various changes and modifications may be made thereto without departing from the spirit and scope of the invention as defined in the appended claims.

LIST OF DESIGNATIONS

100 Wind energy system
101 Rotational axis
102 Tower
103 First end of the tower
104 Foundation
105 Second end of the tower
106 Nacelle
108 Rotor
109 Rotor shaft, rotatable shaft
110 Rotor blade
112 Rotor hub
113 Main rotational direction
115 Rotor bearing housing
116 Interior space
117 First end of the rotor bearing housing
118 Second end of the rotor bearing housing
200 Seal arrangement
201 Anti-friction bearing
202 Seal carrier
203, 204 Seal bodies
205 First end of the seal body
206 Second end of the seal body
207 Main extent axis
208 Annular form
209 Butt joint
210 Projecting region
211, 212 Seal segments
211b, 212b Seal segments
213, 215 First end
214, 216 Second end
217 Further projecting region
218 Further butt joint
219 Fastening region
220 Sealing lip
221 Further sealing lip
223 Tangential direction
224 Shoulder
225 Length
226 Further projecting region
227 Further projecting region
228 Further butt joint
229 Further butt joint
230 Seal intermediate piece 231 First end of the seal intermediate piece
232 Second end of the seal intermediate piece
233 Projecting region of the seal intermediate piece
234, 235 Butt joint

What is claimed is:

1. A seal arrangement for sealing an interior space between a bearing housing and a rotatable shaft with respect to an ambient, the seal arrangement comprising:
   a seal body configured to be fastened to said bearing housing;
   said seal body having a first end and a second end;
   said seal body being elongatedly extended along a main extent direction and being configured to be annularly arranged around said rotatable shaft in a mounted state so as to cause said first and second ends to conjointly define a common abutting interface;
   a projecting region arranged at said first end of said seal body;
   said projecting region extending in an axial direction so as to project tangentially with respect to said rotational shaft in a direction of a predetermined rotation direction of said rotatable shaft so as to cause said projecting region to project to said seal body and overlap said common abutting interface in a ramp-like manner to form in said axial direction, an overlapment with the second end of said seal body on a side of said seal body facing said interior space; and,
   said projecting region being inclined at an angle toward said interior space.

2. The seal arrangement of claim 1, wherein said seal body has a fastening region for fastening to the bearing housing via a seal carrier, and has at least one radially projecting sealing lip which is configured to bear against the rotatable shaft in the mounted state, the projecting region being defined by the sealing lip which faces said interior space.

3. The seal arrangement of claim 1, wherein the projecting region is a structural element which is separate from the seal body and is connected to the seal body at the first end.

4. The seal arrangement of claim 1, wherein the projecting region is connected to the seal body via an adhesive bond.

5. The seal arrangement of claim 1, wherein the projecting region is configured in one piece with the seal body.

6. The seal arrangement of claim 1, wherein said rotatable shaft defines a longitudinal axis and said common abutting interface extends radially with respect to said longitudinal axis.

7. A seal arrangement for sealing an interior space between a bearing housing and a rotatable shaft with respect to an ambient, the seal arrangement comprising:
   a seal body configured to be fastened to said bearing housing;
   wherein:
   said seal body is formed from at least two seal segments;
   each of said seal segments has a first end and a second end;
   said at least two seal segments are annularly arranged around said rotatable shaft in a combined manner in a mounted state so as to cause: i) a first end of a first one of said seal segments and a second end of a second one of said seal segments immediately adjacent said first end of said first one of said seal segments to conjointly define a first common abutting interface; and, ii) a first end of said second one of said seal segments and said second end of said first one of said seal segments immediately adjacent said first end of said second one of said seal segments to conjointly define a second common abutting interface;
   a projection region is arranged on the first end of each seal segment to project along a main extent in an axial direction tangentially with respect to said rotatable shaft in the direction of a predefined main rotational direction of said rotatable shaft so as to cause the corresponding projection region to project to the corresponding seal segment and overlap corresponding ones of said first and second common abutting interfaces in a ramp-like manner to form, in said axial direction, respective overlapments with corresponding ones of said second ends on a side which faces the interior space; and,
   said projection region being inclined at an angle toward said interior space.

8. A seal arrangement for sealing an interior space between a bearing housing and a rotatable shaft with respect to an ambient, the seal arrangement comprising:
   a seal body configured to be fastened to said bearing housing;
   wherein:
   said seal body is formed from at least two seal segments and a seal intermediate piece;
   each of said seal segments and said seal intermediate piece has a first end and a second end;
   said seal segments and said seal intermediate piece are configured to be annularly arranged together around said rotatable shaft in a mounted state so as to cause the first end of a first seal segment of said at least two seal segments and a second end of said seal intermediate piece to conjointly form a first common abutting interface;
   a first end of said seal intermediate piece and the second end of a second seal segment of said two seal segments form a second common abutting interface;
   the first end of said second seal segment and the second end of the first seal segment conjointly form a third common abutting interface;
   a projecting region is arranged at the first end of each of the seal segments, which projecting region projects in an axial direction along a main extent direction tangentially with respect to the rotatable shaft in the direction of a predefined main rotational direction of the rotatable shaft, and a projecting region is arranged at the first end of the seal intermediate piece, which projecting region in said axial direction projects tangentially with respect to the rotatable shaft in the direction of the predefined main rotational direction of the rotatable shaft so as to cause the projecting region of the first seal segment to project to the seal intermediate piece, the projecting region of the seal intermediate piece projects beyond the second seal segment, and the projecting region of the second seal segment projects to the first seal segment so as to cause the corresponding projecting region to overlap the corresponding one of said first, second and third abutting interfaces in a ramp-like manner to form, in said axial direction, respective overlapments with corresponding ones of said second ends on a side which faces said interior space,
   said projection region being inclined at an angle toward said interior space.

9. A wind energy system comprising:
   a rotor shaft rotatable about a rotational axis;
   a bearing for supporting said rotor shaft so as to facilitate rotation thereof;

a rotor bearing housing for accommodating said bearing therein;

said rotor bearing housing and said rotatable shaft conjointly defining an interior space therebetween;

a seal arrangement for sealing said interior space with respect to an ambient;

said seal arrangement including:

a seal body configured to be fastened to said bearing housing;

said seal body having a first end and a second end;

said seal body being elongatedly extended along a main extent direction and being configured to be annularly arranged around said rotatable shaft in a mounted state so as to cause said first and second ends to conjointly define a common abutting interface;

a projecting region arranged at said first end of said seal body;

said projection region extending in an axial direction so as to project tangentially with respect to said rotational shaft in a direction of a predetermined rotation direction of said rotatable shaft so as to cause said projecting region to project to said seal body and overlap said common abutting interface in a ramp-like manner to form, in said axial direction, an overlapment with the second end of said seal body on a side of said seal body facing said interior space;

said seal body being arranged coaxially with respect to the rotational axis around said rotor shaft in relation to said rotational axis axially at a first end of the rotor bearing housing to seal said interior space between said rotor bearing housing and said rotor shaft with respect to a surrounding area or ambient at said first end of the rotor bearing housing; and, said projecting region being inclined at an angle toward said interior space.

10. The wind energy system of claim 9, wherein said seal arrangement has a further seal body which is arranged along said rotational axis axially at a second end of the rotor bearing housing to seal said interior space between the rotor bearing housing and the rotor shaft with respect to a surrounding area or ambient at the second end of said rotor bearing housing.

11. A method for arranging a seal arrangement for sealing an interior space between a bearing housing and a rotatable shaft with respect to a surrounding area or ambient, the method comprising the steps of:

providing a seal body with a first end and a second end, the seal body being extended in an elongate manner along a main extent direction, and the seal body having a projecting region which is arranged at the first end of the seal body;

fastening the seal body to the bearing housing to cause the seal body to surround the rotatable shaft in an annular manner, and the first end and the second end have a common abutting interface, and the projecting region projects in an axial direction tangentially with respect to the rotatable shaft in the direction of a predefined main rotational direction of the rotatable shaft, with the result that the projecting region projects to the seal body and overlaps the common abutting interface to form, in the axial direction, an overlapment with the second end of the seal body on a side which faces the interior space; and, wherein the projecting region is inclined at an angle toward the interior space.

12. The method of claim 11, further comprising the steps of:

providing the seal body including dismantling of the seal body from a bearing and the bearing housing in a state in which the seal body does not have the projecting region; and, removing a part region of the seal body causing the projecting region to be configured.

13. The method of claim 12 comprising the further steps of:

providing a seal intermediate piece which has a projecting region;

arranging a seal segment of the seal body and of the seal intermediate piece, with the result that a first end of the seal segment and a second end of the seal intermediate piece form a first common abutting interface;

a first end of the seal intermediate piece and the second end of the seal segment form a second common abutting interface;

the projecting region of the seal intermediate piece being arranged at the first end of the seal intermediate piece, which projecting region projects in said axial direction and tangentially with respect to the rotatable shaft in the direction of a predefined main rotational direction of the rotatable shaft;

a projecting region of the seal segment projects to the seal intermediate piece, and the projecting region of the seal intermediate piece projects to the seal segment, with the result that the respective projecting regions overlap the respective first and second abutting interfaces in a ramp-like manner to form respective overlapments in said axial direction with corresponding ones of said second ends of the seal segment and said seal intermediate piece on a side which faces the interior space; and, fastening the seal segment and the seal intermediate piece to the bearing housing.

14. The method of claim 12, the seal body having at least two seal segments, the method comprising the further steps of:

removing in each case a part region of the seal segment with the result that each of the seal segments has a projecting region;

providing a seal intermediate piece which has a projecting region;

arranging the seal segments and the seal intermediate piece, with the result that a first end of the first seal segment and a second end of the seal intermediate piece form a common abutting interface;

a first end of the seal intermediate piece and a second end of the second seal segment form a common abutting interface;

a first end of the second seal segment and a second end of the first seal segment form a common abutting interface;

and the projecting region being arranged in each case at the first end of the seal segment, which projecting region projects along the main extent direction tangentially with respect to the rotatable shaft in the direction of the predefined main rotational direction of the rotatable shaft;

and the projecting region being arranged at the first end of the seal intermediate piece, which projecting region projects tangentially with respect to the rotatable shaft in the direction of the predefined main rotational direction of the rotatable shaft, and the projecting region of the first seal segment projecting to the seal intermediate piece, the projecting region of the seal intermediate piece projecting to the second seal segment, and the projecting region of the second seal segment projecting to the first seal segment, with the result that the respective projecting regions overlap the respective associated abutting interfaces in a ramp-like manner to form respective overlapments across corresponding ones of said abutting interfaces on a side which faces the interior space; and, fastening the seal segments and the seal intermediate piece to the bearing housing.

15. A seal arrangement for sealing an interior space between a bearing housing and a rotatable shaft with respect to an ambient, the rotatable shaft defining a rotation axis and the seal arrangement comprising:

a seal body configured to be fastened to said bearing housing;

said seal body having a first end and a second end;

said seal body being elongatedly extended along a main extent direction and being configured to be annularly arranged around said rotatable shaft in a mounted state so as to cause said first and second ends to conjointly define a common abutting interface;

a projecting region arranged at said first end of said seal body;

said projecting region extending in an axial direction so as to project tangentially with respect to said rotational shaft in a direction of a predetermined rotation direction of said rotatable shaft so as to cause said projecting region to project to said seal body and overlap said common abutting interface in a ramp-like manner to form, in said axial direction, an overlapment with the second end of said seal body on a side of said seal body facing said interior space;

said second end of said seal body extending along a straight line radially with respect to the rotation axis of said rotatable shaft; and, said projecting region being inclined at an angle toward said interior space.

* * * * *

UNITED STATES PATENT AND TRADEMARK OFFICE
CERTIFICATE OF CORRECTION

PATENT NO.        : 12,037,986 B2
APPLICATION NO.   : 17/852098
DATED             : July 16, 2024
INVENTOR(S)       : Matthias Kohlrusch Page 1 of 1

It is certified that error appears in the above-identified patent and that said Letters Patent is hereby corrected as shown below:

On the Title Page

Under FOREIGN PATENT DOCUMENTS
Second Line: delete "DE" and insert -- DD -- therefor.

Signed and Sealed this
Twenty-sixth Day of November, 2024

Katherine Kelly Vidal
*Director of the United States Patent and Trademark Office*